US009729996B2

(12) United States Patent
Yang

(10) Patent No.: US 9,729,996 B2
(45) Date of Patent: Aug. 8, 2017

(54) MOBILE TERMINAL, AND METHOD AND DEVICE FOR UPDATING SETUP INFORMATION THEREOF

(75) Inventor: Zhibing Yang, Huizhou (CN)

(73) Assignee: HUIZHOU TCL MOBILE COMMUNICATION CO., LTD., Huizhou (CN)

(*) Notice: Subject to any disclaimer, the term of this patent is extended or adjusted under 35 U.S.C. 154(b) by 814 days.

(21) Appl. No.: 13/517,134

(22) PCT Filed: May 18, 2011

(86) PCT No.: PCT/CN2011/074268
§ 371 (c)(1),
(2), (4) Date: Jun. 19, 2012

(87) PCT Pub. No.: WO2012/024946
PCT Pub. Date: Mar. 1, 2012

(65) Prior Publication Data
US 2012/0252419 A1    Oct. 4, 2012

(30) Foreign Application Priority Data
Aug. 26, 2010   (CN) .......................... 2010 1 0265463

(51) Int. Cl.
*H04W 4/00*     (2009.01)
*G01S 19/39*    (2010.01)
(Continued)

(52) U.S. Cl.
CPC ....... *H04W 4/001* (2013.01); *H04M 1/72572* (2013.01); *H04W 4/02* (2013.01);
(Continued)

(58) Field of Classification Search
USPC ...................................... 455/456.1–457, 566
See application file for complete search history.

(56) References Cited

U.S. PATENT DOCUMENTS 7,791,499 B2 *   9/2010   Mohan et al. ................. 340/902
7,965,231 B2 *   6/2011   Kirmuss ................. G01C 21/20
                                                           342/357.34
(Continued)

FOREIGN PATENT DOCUMENTS

CN          1854751 A      11/2006
CN        101350855 A       1/2009
(Continued)

*Primary Examiner* — Steven Kelley
(74) *Attorney, Agent, or Firm* — Shimokaji IP

(57) ABSTRACT

The invention relates to the technical field of mobile terminals and discloses a mobile terminal and a method and device for updating the setup information thereof. The method comprises: obtaining a National Marine Electronics Association (NMEA) position message through the Global Positioning System (GPS); interpreting the NMEA message to obtain the current time and the current position information of the mobile terminal; obtaining a nation to which the current position belongs according to the position information, recognizing the language of the nation; and updating the setup information of the mobile terminal according to the recognized language and the current time. Through the invention, the setup information of the mobile terminal can be updated according to the location of the mobile terminal.

18 Claims, 2 Drawing Sheets

(51) Int. Cl.
*H04W 4/02* (2009.01)
*H04M 1/725* (2006.01)

(52) U.S. Cl.
CPC ......... *G01S 19/39* (2013.01); *H04M 2250/10* (2013.01); *H04M 2250/58* (2013.01)

(56) References Cited

U.S. PATENT DOCUMENTS

| | | | | |
|---|---|---|---|---|
| 8,063,792 | B2* | 11/2011 | Sala | G01D 4/00 340/870.02 |
| 8,588,814 | B2* | 11/2013 | Jayanthi | G01C 21/3438 340/988 |
| 2001/0027108 | A1* | 10/2001 | Sumino | H04M 1/72572 455/456.6 |
| 2002/0142783 | A1* | 10/2002 | Yoldi et al. | 455/456 |
| 2005/0020278 | A1* | 1/2005 | Krumm et al. | 455/456.1 |
| 2005/0203703 | A1* | 9/2005 | Chang | 701/213 |
| 2006/0197672 | A1* | 9/2006 | Talamas et al. | 340/573.3 |
| 2006/0223549 | A1* | 10/2006 | Chang | 455/456.2 |
| 2008/0188210 | A1* | 8/2008 | Choi et al. | 455/414.3 |
| 2008/0194275 | A1* | 8/2008 | Koch et al. | 455/457 |
| 2009/0043490 | A1* | 2/2009 | Jung | 701/201 |
| 2009/0216448 | A1* | 8/2009 | Chang | 701/214 |
| 2009/0322567 | A1* | 12/2009 | Stock et al. | 340/963 |
| 2010/0120422 | A1* | 5/2010 | Cheung et al. | 455/434 |
| 2010/0190479 | A1* | 7/2010 | Scott et al. | 455/414.1 |
| 2011/0202233 | A1* | 8/2011 | Hatton | 701/36 |

FOREIGN PATENT DOCUMENTS

| | | |
|---|---|---|
| CN | 101742401 A | 6/2010 |
| CN | 101754367 A | 6/2010 |
| CN | 101938694 A | 1/2011 |

* cited by examiner

MOBILE TERMINAL, AND METHOD AND DEVICE FOR UPDATING SETUP INFORMATION THEREOF

TECHNICAL FIELD OF THE INVENTION

The invention relates to the technical field of mobile terminals, and in particular to a mobile terminal and a method and device for updating the setup information thereof.

BACKGROUND OF THE INVENTION

With the continuous development of mobile terminal technology, users have increasing requirements on functions of mobile terminals.

Take mobile phones as an example. The activity range increasingly extends as the social circle of people expands. Activities for example: flying to America from China on a business trip; international trade becomes abundant; mobile phones of a same model are sold to both France and Korea; may cause that mobile phones of a same type may be used in different countries. This may require that a mobile phone arriving in each new place needs to be reset for time, language and place information Similarly, after each mobile phone is used for the first time or powered off for a long time, the user also needs to reset time, language and place information of the mobile phone. The user has to know the current time, place and language information in order to reset this information, which brings great inconvenience to the user.

How to update the setup information of the mobile terminal in time according to a location of the mobile terminal in order to improve the humanization of the mobile terminal is one of the research directions of the field of mobile terminals.

SUMMARY OF THE INVENTION

An object of the present invention is to provide a method for updating the setup information of a mobile terminal, to update the setup information of the mobile terminal in time according to a location of the mobile terminal in order to improve the humanization of mobile terminals.

The embodiment of the invention is implemented as follows: a method for updating the setup information of a mobile terminal is provided, comprising the following steps:

obtaining a National Marine Electronics Association (NMEA) position message through a Global Positioning System (GPS);

interpreting the NMEA position message to obtain a current time and a current position information of the mobile terminal;

obtaining a nation to which the current position belongs according to the current position information, and recognizing a language type of the nation corresponding to the current information;

updating the setup information of the mobile terminal according to the recognized language type and the current time.

Another object of the embodiment of the invention is to provide a device for updating the setup information of a mobile terminal, comprising:

a National Marine Electronics Association (NMEA) message obtaining module, configured to obtain a NMEA position message through a GPS;

a NMEA message interpretation module, configured to interpret the NMEA position message to obtain a current time and a current position information of the mobile terminal;

a language type obtaining module, configured to obtain a nation to which the current position belongs according to the position information, and configured to recognize a language type of the nation;

a setup information updating module, configured to update the setup information of the mobile terminal according to the language type and the current time.

Still another object of the embodiment according to the present invention is to provide a mobile terminal, and the terminal comprises a device for updating the setup information provided in the embodiment of the invention.

In some embodiments of the invention, the mobile terminal obtains the latitude and longitude information and time information of a current location according to the received GPS signal, obtains the nation to which the position corresponds and the language of the nation according to the latitude and longitude information, updates the setup information of the mobile terminal according to the obtained language and time information, so as to be able to update the setup information of the mobile terminal according to the location of the mobile terminal, so that operation of mobile terminals is improved, and the global use of mobile terminals is facilitated.

DETAILED DESCRIPTION OF THE INVENTION

To make the purposes, technical solutions and advantages of the invention more clear, the invention will be further described in details below with reference to drawings and embodiments. It should be understood that specific embodiments described herein are only used for explaining the invention, instead of limiting the invention.

Figure 1:
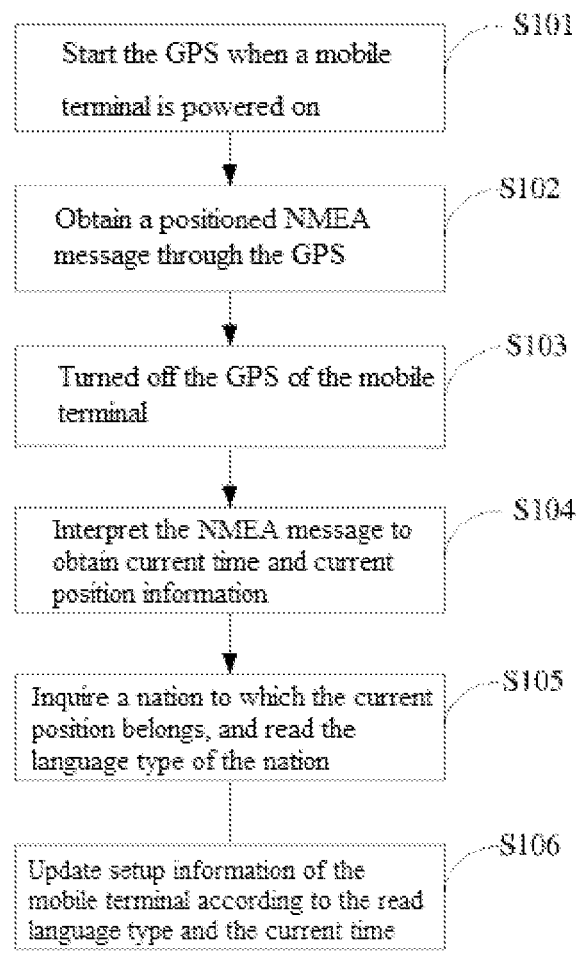
FIG. 1 is a flow chart of a method for updating setup information of a mobile terminal, provided in an exemplary embodiment according to the present invention.

FIG. 1 illustrates a flow chart of a method for updating the setup information of a mobile terminal, according to an exemplary embodiment of the present invention.

In step S101, when a mobile terminal is powered on, the GPS is initiated.

In step S102, a NMEA message position is obtained through the GPS.

In step S103, the GPS of the mobile terminal is turned off.

In step S104, the NMEA position message is interpreted to obtain information corresponding to a current time and a current position of the mobile terminal.

The position information is a latitude and a longitude of the current position. Of course, the position information may be in other forms, which will not be listed herein.

In step S105, a nation associated with the current position is obtained according to the position information, and a language type of the nation is recognized.

In step S106, the setup information of the mobile terminal is updated according to the recognized language type and the current time.

In mobile phones, the setup information is generally stored in the file system, for example, in a Non-Volatile Random Access Memory (NVRAM). Each kind of data will be stored in a specifically allocated position in the file system, and allocated with a fixed ID number that corresponds to the fixed physical storage position. When certain data needs updating, the specific position of the data in the file system is found according to the ID number corresponding to the data, and then new data is written into the proper position in the file system.

For example, when new time data is obtained, a corresponding position in the file system is found according to an ID number that is allocated to the "TIME" setting item in advance, and then new "TIME" data is written into this position. After new data is written, a variable of "TIME" data in the memory is updated simultaneously. In this way, the display in the UI setting item will also be updated to new time. Similarly, data information of "LOCATION" and "LANGUAGE" may be updated.

The NMEA message and the interpretation of the message are described as follows.

Most GPS devices follow the NMEA protocol. After the GPS of mobile phones is started, it continuously obtains positioning messages, for example, Recommended Minimum Specific GPS/TRANSIT Data ($ GPRMC), i.e., NMEA messages, and these positioning messages contain the current time and the current position information of mobile phones, for example, latitude and longitude.

Communication statements specified by the NMEA communication protocol have already been based on ASCII codes, and the data format of NMEA messages is as follows:
  "$" is the mark at the beginning of statements;
  "," is the domain separator;
  "*" is the check and identification mark, the two numbers after it represent the checksum that is the checksum of all character codes between "$" and "*", but not including "$" and "*" two characters;
  "/" is the terminator, with which all statements must end, i.e., "CARRIAGE RETURN" and "LINE-FEEDS" of ASCII characters.
$ GPRMC data format is as follows:
$GPRMC,<1>, <2>, <3>, <4>, <5>, <6>, <7>, <8>, <9>, <10>, <11>, <12>*hh<CR><LF>
Description of each field:
$ GPRMC: frame header; <1> UTC time: hhmmss.sss; <2> state: A/V; <3> latitude: ddmm.mmmm; <4> north latitude/south latitude: N/S; <5> longitude: dddmm.mmmm; <6> east longitude/west longitude: E/W; <7> speed: section; <8> azimuth: degree; <9> UTC date: ddmmyy; <10> magnetic declination: 000-180; <11> direction of magnetic declination: E/W; <12> mode: A/D/E/N; *hh: check; <CR><LF>: carriage return and line-feeds.
For example:
$GPRMC,121252.000,A,3958.3032,N,11629.6046,E, 15.15,359.95,070306,,,A*54
where, field 1 and field 9 represent the time: Mar. 7, 2006 12:12:52;
field 3 and field 4 represent the latitude: 39° 58.3032' N;
field 5 and field 6 represent the longitude: 116° 29.6046' E.

Interpretation of GPRMC messages: data is sent by statements for NMEA messages, the GPS of mobile phones may receive statements in many types, but in an exemplary embodiment of the invention, only several fields in GPRMC messages are needed; therefore it is necessary to interpret the received data to obtain the wanted information.

The wanted messages are separated by a function, as each kind of message begins with character $ and ends with CR+LF, the function obtains the type of messages first from the header of each message, if the message is found to be $ GPRMC, the function reads the whole complete message, that is, from the message header $ to CR+LF, to start to interpret each field of the message.

As message $ GPRMC contains a lot of fields, and each field is separated by ",", "," is used as the separator, that is, a "," indicates the end of one field, the wanted fields are respectively read according to this sequence.

Field 1 is read to obtain the current year, month and day information. Field 9 is read to obtain the current hour, minute and second information. Field 3 is read to obtain the north latitude and south latitude, and then field 4 is read to obtain the latitude information. Field 5 is read to obtain east longitude and west longitude, and then field 6 is read to obtain the longitude.

Through the values of latitude and longitude in the current mobile phone, a corresponding nation is retrieved from one table, and the language of the nation is obtained. The table defines the range of latitude and longitude of each nation: for example, the range of latitude and longitude of Britain is: 2° E. to 7° W. and 50° N. to 58° N. If the mobile phone is within this range, it is indicated that the current position is in England.

Figure 2:
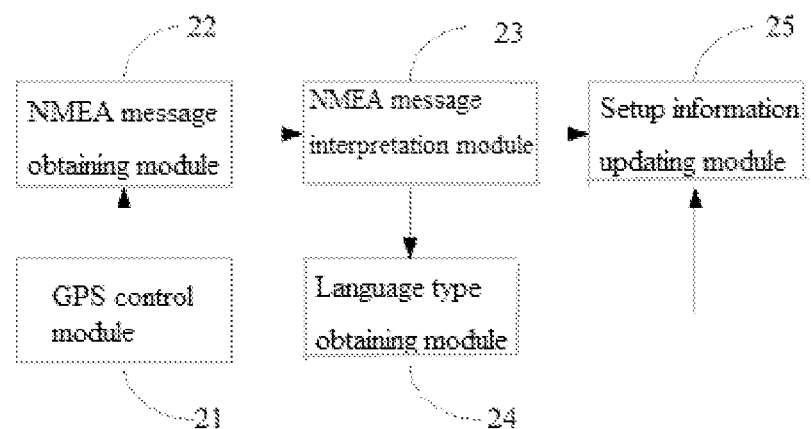
FIG. 2 is a structure diagram of a device for updating setup information of a mobile terminal, provided in an exemplary embodiment according to the present invention.

FIG. 2 illustrates a structure of a device for updating setup information of a mobile terminal, provided in an exemplary embodiment according to the present invention.

GPS control module 21 is configured to control ON/OFF of the GPS function of a mobile terminal.

NMEA message obtaining module 22 is configured to obtain a NMEA position message through the GPS function.

NMEA message interpretation module 23, is configured to interpret the NMEA position message to obtain the current time and the current position of a mobile terminal.

The position information is the latitude and longitude of the current position.

Language type obtaining module 24 is configured to recognize a nation to which the current position belongs to according to the position information, and recognize the language of the nation.

Setup information updating module 25 is configured to update the setup information of the mobile terminal according to the recognized language and the current time.

An embodiment of the invention further provides a mobile terminal, and the terminal comprises the device for updating the setup information as the device has been described in details above, and it will not described again herein.

In some embodiments of the invention, the mobile terminal obtains the latitude and longitude information and time information of the current location according to the received GPS signal, obtains the nation to which the position belongs to and the language of the nation according to the latitude and longitude information, updates the setup information of the mobile terminal according to the obtained language and time information, so as to be able to update the setup information of the mobile terminal according to the location of the mobile terminal, so that the operation of mobile terminals is improved, and the global use of mobile terminals is facilitated.

It should be understood that, for those skilled in the art, the invention may have modifications or alternations according to the above description, and these modifications and alternations should be included within the protection scope defined by the claims of the invention.

The invention claimed is:

1. A method for updating setup information of a mobile terminal, comprising:
   obtaining a language table that correlates position information with respective language types;
   obtaining a National Marine Electronics Association (NMEA) position message through a Global Positioning System (GPS);
   processing only a first portion of the NMEA position message to obtain current position information of the mobile terminal, wherein the first portion includes no more than fields 3, 4, 5 and 6;
   processing only a second portion of the NMEA position message to obtain current time information in the location of the mobile terminal, wherein the second portion includes no more than fields 1 and 9;
   obtaining a nation to which the current position belongs according to the current position information;
   recognizing a language type of the nation corresponding to the current position information based on the language table; and
   updating the setup information of the mobile terminal according to the recognized language type, wherein updating the setup information of the mobile terminal includes storing the recognized language type in a specifically allocated memory position, within the mobile terminal, corresponding to a fixed ID number that corresponds to a fixed physical storage position, to update an initial language type that was previously stored in the specifically allocated memory position, wherein updating setup information comprises updating to a new language, a new location, and a new time such that a user interface of the mobile terminal displays according to the new language, the new location, and the new time.

2. The method for updating the setup information of the mobile terminal according to claim 1, wherein after the NMEA position message is obtained through the GPS, the method further comprises:
   the GPS of the mobile terminal is turned off.

3. The method for updating the setup information of the mobile terminal according to claim 1, wherein the current position information is a latitude and a longitude of the current position.

4. The method of claim 1, wherein the nation is obtained by referring to a table.

5. The method of claim 4, wherein the table includes a range of latitude and longitude for each nation in the GPS.

6. The method of claim 5, wherein the table includes each language associated with each range of latitude and longitude for each country.

7. A device for updating setup information of a mobile terminal, comprising:
   a memory including a file system having a fixed time position and a fixed language position, wherein an initial time is stored in the fixed time position and an initial language is stored in fixed language position;
   a National Marine Electronics Association (NMEA) message obtaining module, configured to obtain a NMEA position message through a global positioning system (GPS);
   a NMEA message interpretation module, configured to interpret only fields 1, 3, 4, 5, 6 and 9 of the NMEA position message to obtain a current time and a current position information of a mobile terminal;
   a language type obtaining module, configured to obtain a nation to which the current position belongs according to the position information, and configured to correlate a language of the nation and using that language in updating the setup information of the mobile terminal;
   a setup information updating module, configured to update the setup information of the mobile terminal according to the language type and the current time, wherein the current time is stored in the fixed time position of the memory in place of the initial time, and wherein the language type is stored in the fixed language position of the memory in place of the initial language, wherein setup information includes a new language, a new location, and a new time such that a user interface of the mobile terminal displays according to the new language, the new location, and the new time.

8. The device for updating the setup information of the mobile terminal according to claim 7, further comprising:
   a GPS control module, configured to control an ON/OFF state of a GPS function of the mobile terminal.

9. The device for updating the setup information of the mobile terminal according to claim 7, wherein the current position information is a latitude and a longitude of the current position.

10. The device for updating the setup information of the mobile terminal according to any one of claim 7, wherein the device is a mobile terminal.

11. The device for updating the setup information of the mobile terminal according to claim 7, wherein the NMEA message interpretation module is configured to access a table to obtain the nation to which the current position belongs.

12. The device for updating the setup information of the mobile terminal according to claim 11, wherein the table includes a range of latitude and longitude for each nation in the GPS.

13. The device for updating the setup information of the mobile terminal according to claim 12, wherein the table includes each language associated with each range of latitude and longitude for each country.

14. The device for updating the setup information of the mobile terminal according to claim 8, wherein the NMEA message interpretation module is configured to obtain the current position information continuously while the GPS function is in the ON state.

15. A mobile telephone, comprising:
   a National Marine Electronics Association (NMEA) message obtaining module, configured to obtain a NMEA position message through a global positioning system (GPS);
   a NMEA message interpretation module, configured to interpret the NMEA position message to obtain a current position information of the mobile telephone, including only processing pre-determined fields of the NMEA message to obtain the information contained therein relating to location and time, wherein the pre-determined fields include fields 1, 3, 4, 5, 6 and 9;
   a language type obtaining module, configured to obtain a nation to which the current position belongs according to a range of latitude and longitude values that encompass the current position information, and configured to recognize a language type of the nation, wherein a geographic area, corresponding to a current language type, is defined by the range of latitude and longitude values; and
   a setup information updating module, configured to update the setup information in a specifically allocated memory position of the mobile terminal, according to the current language type, by replacing an initial language type, that was previously stored in the specifically allocated memory position, with the current language type, wherein the setup information updating module is further configured to update a display of the mobile terminal according to the current language type.

16. The mobile telephone according to claim 15, wherein the obtained nation is based on a table including a range of latitude and longitude for each nation in the GPS.

17. The mobile telephone according to claim 16, wherein the recognized language is associated with the range of latitude and longitude of the obtained nation in the table.

18. The mobile telephone according to claim 15, wherein the mobile telephone is configured to turn off the NMEA message obtaining module after obtaining the current position information and prior to the setup information module updating the setup information.

* * * * *